(12) United States Patent
Ho

(10) Patent No.: US 10,165,405 B2
(45) Date of Patent: Dec. 25, 2018

(54) EMP-SHIELDED, POWER-INDEPENDENT SMS TEXT TOWER SYSTEM FOR NUCLEAR COMMUNICATIONS

(71) Applicant: Joel Ho, Saratoga, CA (US)

(72) Inventor: Joel Ho, Saratoga, CA (US)

( * ) Notice: Subject to any disclaimer, the term of this patent is extended or adjusted under 35 U.S.C. 154(b) by 620 days.

(21) Appl. No.: 14/944,254

(22) Filed: Nov. 18, 2015

(65) Prior Publication Data

US 2016/0157075 A1    Jun. 2, 2016

Related U.S. Application Data

(60) Provisional application No. 62/085,467, filed on Nov. 28, 2014.

(51) Int. Cl.
| | | |
|---|---|---|
| *H04W 28/02* | (2009.01) | |
| *H04W 4/02* | (2018.01) | |
| *H04W 4/14* | (2009.01) | |
| *H04W 52/02* | (2009.01) | |
| *H04W 56/00* | (2009.01) | |
| *H04W 24/04* | (2009.01) | |
| *H04W 4/90* | (2018.01) | |
| *H04W 84/04* | (2009.01) | |
| *H04W 88/08* | (2009.01) | |

(52) U.S. Cl.
CPC ............. *H04W 4/023* (2013.01); *H04W 4/14* (2013.01); *H04W 4/90* (2018.02); *H04W 24/04* (2013.01); *H04W 28/0247* (2013.01); *H04W 52/0206* (2013.01); *H04W 56/0015* (2013.01); *H04W 84/042* (2013.01); *H04W 88/08* (2013.01); *Y02D 70/1262* (2018.01); *Y02D 70/164* (2018.01); *Y02D 70/26* (2018.01)

(58) Field of Classification Search
CPC ..... H04W 16/24; H04W 40/22; H04W 4/021; H04W 4/06
USPC .............................. 455/404.2, 561, 566, 572
See application file for complete search history.

(56) References Cited

U.S. PATENT DOCUMENTS

| | | | |
|---|---|---|---|
| 7,042,858 B1 * | 5/2006 | Ma | ......................... H04L 1/0618 370/208 |
| 8,655,939 B2 | 2/2014 | Redlich et al. | |
| 8,666,358 B2 | 3/2014 | Qu et al. | |
| 9,037,169 B2 | 5/2015 | Cabos | |
| 2008/0298587 A1 * | 12/2008 | Luk | ......................... H04L 9/083 380/255 |

(Continued)

FOREIGN PATENT DOCUMENTS

| | | |
|---|---|---|
| AU | 2011201033 B2 | 5/2013 |
| CN | 101401254 A | 4/2009 |

(Continued)

*Primary Examiner* — Sam Bhattacharya
(74) *Attorney, Agent, or Firm* — Mendelsohn Dunleavy, P.C.; Steve Mendelsohn

(57) ABSTRACT

In one embodiment, a base station for a cellular wireless communication system has one or more antennas that transmit and receive communications signals to and from wireless units within a coverage area of the base station, where the communications signals include text messages. A base station controller processes the communications signals. One or more solar arrays convert light into power and one or more batteries store power for operating the base station independent of a power grid. The base station has at least some components that are hardened against electromagnetic pulse (EMP) events.

39 Claims, 4 Drawing Sheets

(56) References Cited

U.S. PATENT DOCUMENTS

| | | |
|---|---|---|
| 2009/0102743 A1 | 4/2009 | Hager |
| 2010/0067507 A1* | 3/2010 | Park .................. H04W 56/00 |
| | | 370/338 |
| 2010/0250497 A1 | 9/2010 | Redlich et al. |
| 2011/0066297 A1 | 3/2011 | Saberi et al. |
| 2011/0286325 A1* | 11/2011 | Jalali ................. H04B 7/18506 |
| | | 370/221 |
| 2012/0076152 A1* | 3/2012 | Mansharamani ....... G06F 9/546 |
| | | 370/413 |
| 2012/0153168 A1* | 6/2012 | Langeveld ............. G01T 3/008 |
| | | 250/366 |
| 2012/0196646 A1* | 8/2012 | Crinon .................. G06Q 30/02 |
| | | 455/524 |
| 2013/0107808 A1* | 5/2013 | He ..................... H04W 56/001 |
| | | 370/328 |
| 2014/0036421 A1* | 2/2014 | Leiba ..................... H01R 13/20 |
| | | 361/679.01 |
| 2015/0162974 A1 | 6/2015 | Trook |
| 2015/0362756 A1* | 12/2015 | Wiser ..................... G02C 7/083 |
| | | 351/210 |
| 2017/0012668 A1* | 1/2017 | Fang ................... H04W 88/085 |
| 2017/0086052 A1* | 3/2017 | Hunukumbure ........ H04W 4/90 |
| 2017/0223943 A1* | 8/2017 | Park ..................... A01M 1/026 |

FOREIGN PATENT DOCUMENTS

| | | |
|---|---|---|
| DE | 102010007418 A1 | 8/2001 |
| KR | 101167620 B1 | 7/2012 |
| KR | 20130009918 A | 1/2013 |
| KR | 101255722 B1 | 4/2013 |
| KR | 101335653 B1 | 12/2013 |
| KR | 101426743 B1 | 8/2014 |
| KR | 101443676 B1 | 9/2014 |
| KR | 101547869 | 8/2015 |
| TW | 201032629 A | 9/2010 |
| WO | WO2009143287 A1 | 11/2009 |
| WO | WO2011028261 A2 | 3/2011 |
| WO | WO2012086886 A1 | 6/2012 |
| WO | WO2014004996 A1 | 1/2014 |

* cited by examiner

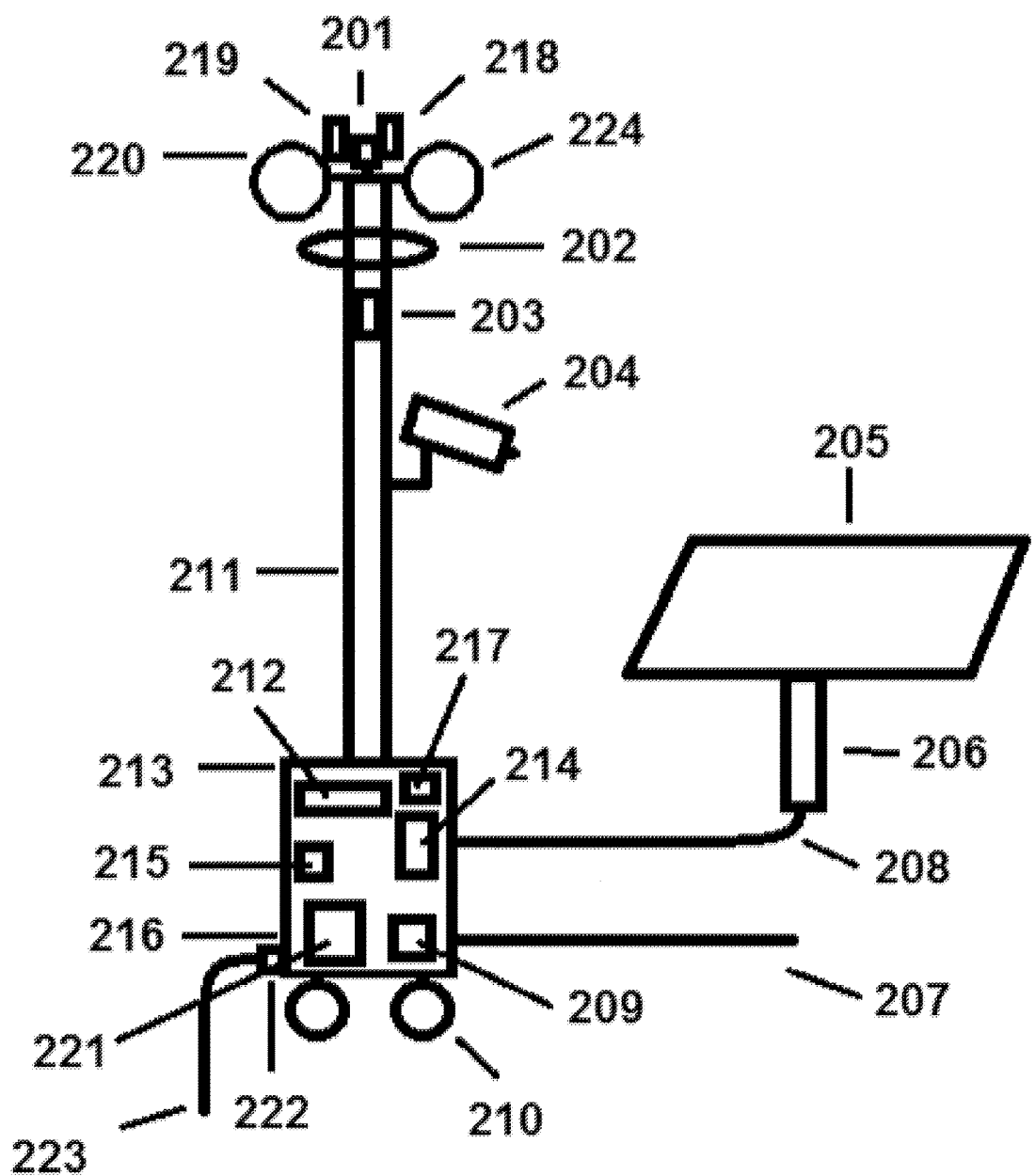

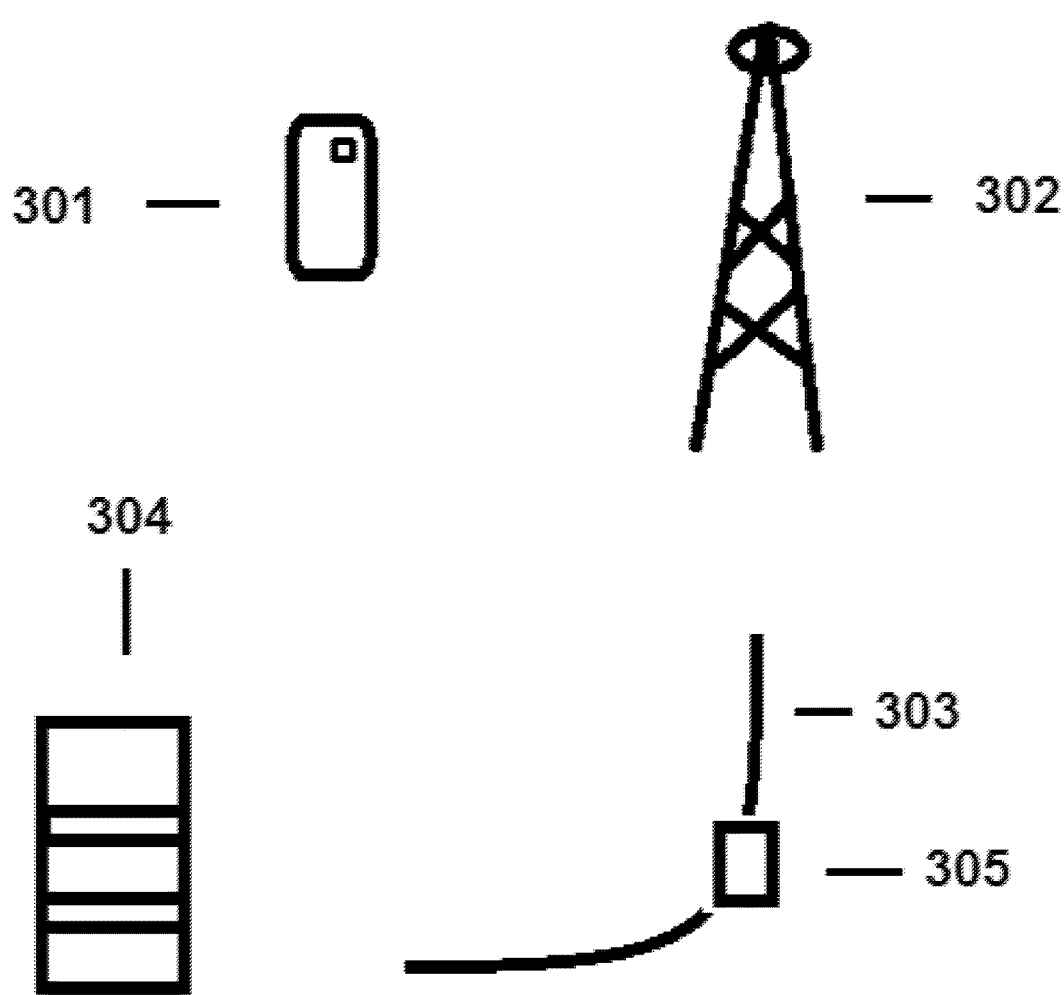

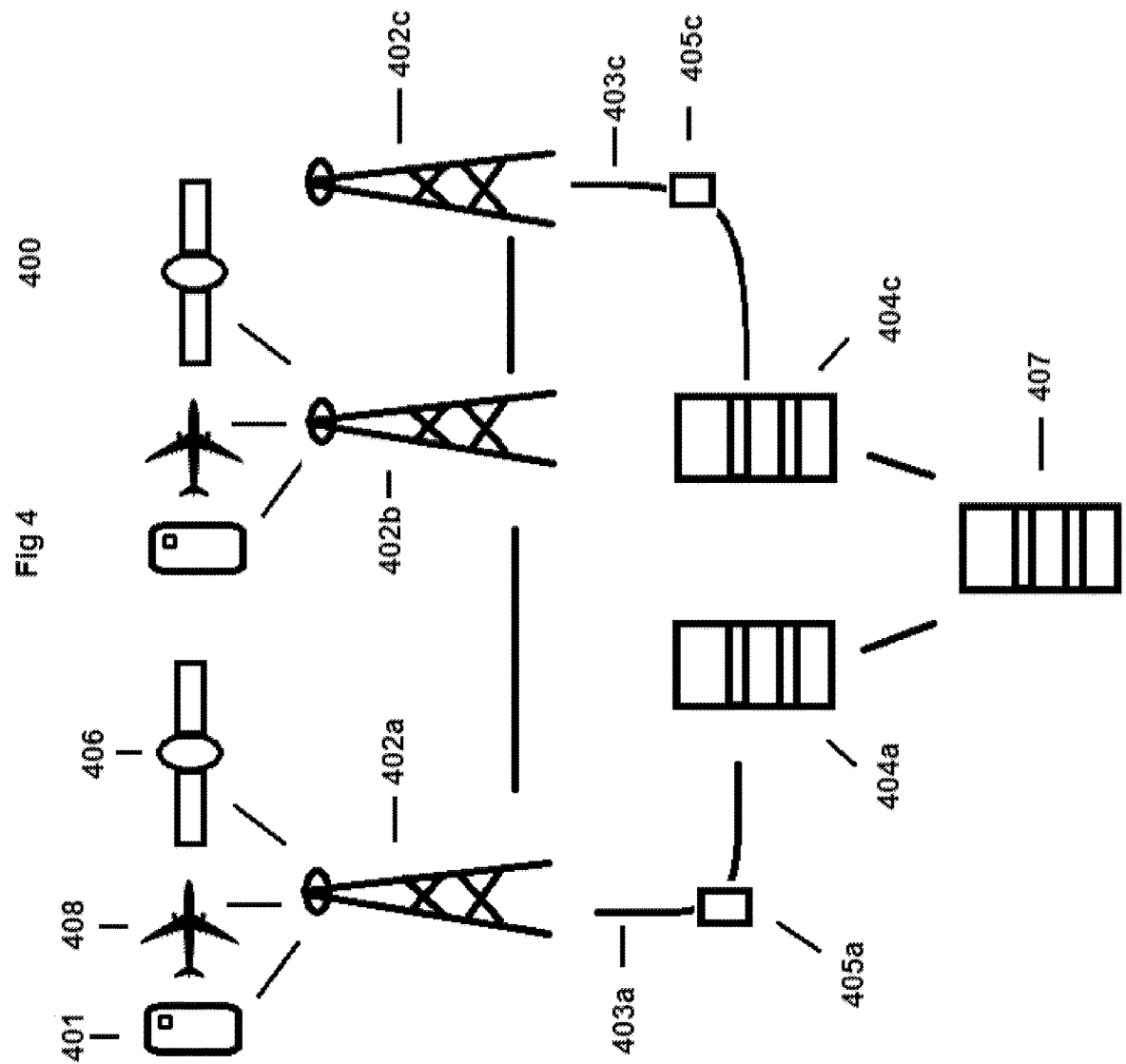

EMP-SHIELDED, POWER-INDEPENDENT SMS TEXT TOWER SYSTEM FOR NUCLEAR COMMUNICATIONS

CROSS-REFERENCE TO RELATED APPLICATIONS

This application claims the benefit of the filing date of U.S. provisional application No. 62/085,467, filed on Nov. 28, 2014, the teachings of which are incorporated herein by reference in their entirety.

BACKGROUND

Field of the Invention

The present invention relates to cellular communications.

Description of the Related Art

This section introduces aspects that may help facilitate a better understanding of the invention. Accordingly, the statements of this section are to be read in this light and are not to be understood as admissions about what is prior art or what is not prior art.

The following background information may present examples of specific aspects of the prior art (e.g., without limitation, approaches, facts, or common wisdom) that, while expected to be helpful to further educate the reader as to additional aspects of the prior art, is not be construed as limiting the present invention, or any embodiments thereof, to anything stated or implied therein or inferred thereupon.

Modern mass two-way communication systems are designed to support either a limited user base with maximum reliability (e.g., military and government users under any circumstances) or a broad user base with significant bandwidth under most (but not all) circumstances (e.g., "99.9% uptime" for telecom companies). In the event of an electromagnetic pulse (EMP) disrupting the power to the telecom networks, two-way communications would be inoperable since the telecom networks are not hardened to withstand EMPs as a whole. Portions of the networks may be hardened, but the system as a whole can be assumed not to function. Even if these systems survive an EMP, they cannot operate indefinitely without power since limited or no on-site power generation capacity exists, and the power grid cannot survive an EMP. On the other hand, government communications systems are reliable, but would not be able to handle sudden large influxes of communications traffic including civilian data.

SUMMARY

In certain embodiments, the present invention is designed to handle numbers of users that conventional telecom networks handle, but have the reliability of EMP-hardened government systems while costing relatively little.

In one embodiment, the present invention is a base station for a cellular wireless communication system comprising the base station and a plurality of other base stations. The base station comprises (i) one or more antennas configured to transmit and receive communications signals to and from one or more wireless units within a coverage area of the base station, wherein the communications signals include text messages; (ii) a base station controller configured to process the communications signals; (iii) one or more solar arrays configured to convert light into power for operating the base station independent of any power grid; and (iv) one or more batteries configured to store power for operating the base station independent of any power grid, wherein the base station comprises at least some components that are hardened against electromagnetic pulse (EMP) events.

BRIEF DESCRIPTION OF THE DRAWINGS

Embodiments of the invention will become more fully apparent from the following detailed description, the appended claims, and the accompanying drawings in which like reference numerals identify similar or identical elements.

FIG. 2 illustrates an exemplary base station of a communications system, in accordance with another embodiment of the present invention;

FIG. 3 illustrates a basic exemplary communications system, in accordance with one embodiment of the present invention; and FIG. 4 illustrates a more-complex exemplary communications system, in accordance with another embodiment of the present invention.

DETAILED DESCRIPTION

Figure 1:
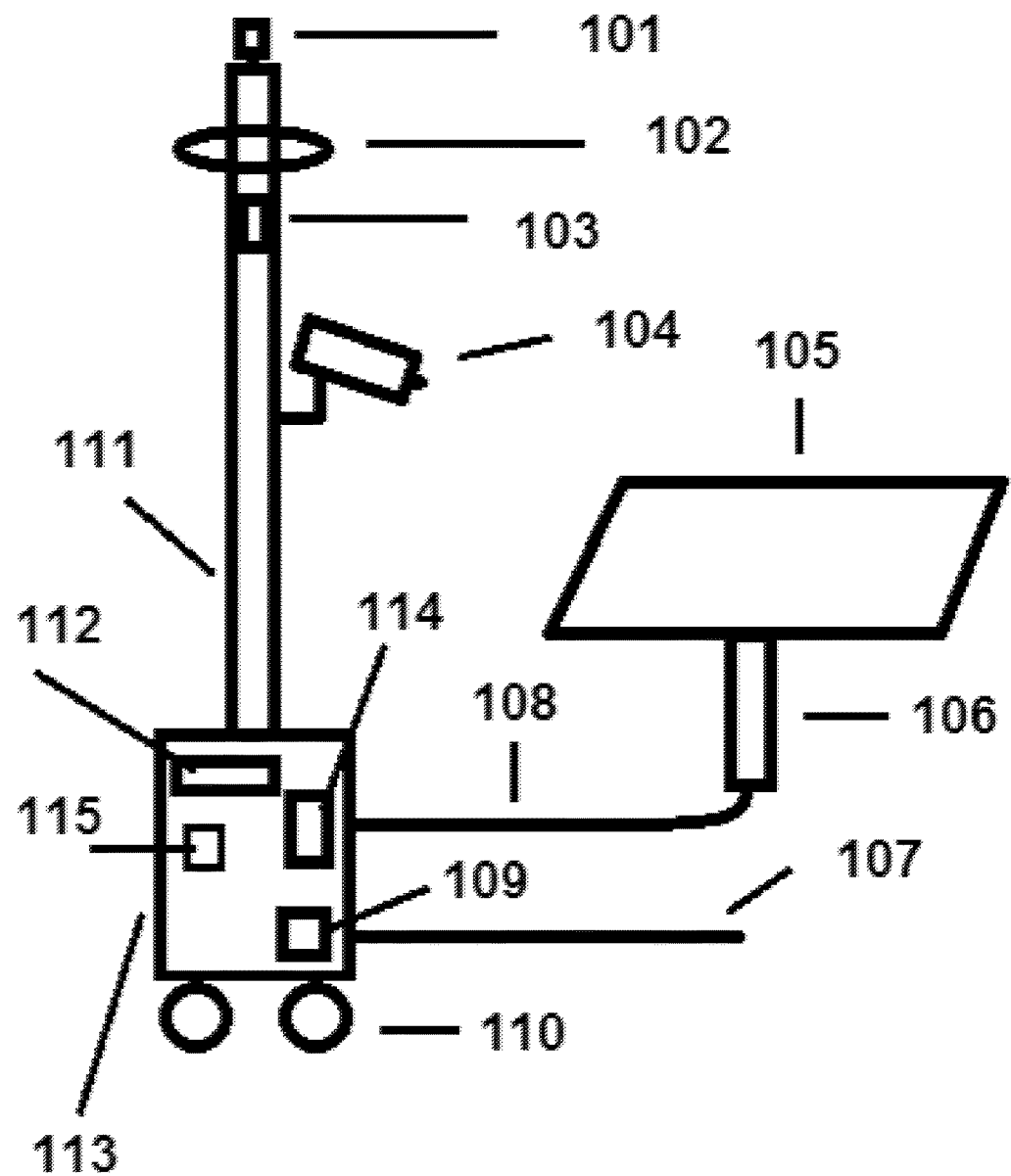
FIG. 1 illustrates an exemplary base station of a communications system, in accordance with an embodiment of the present invention.

Detailed illustrative embodiments of the present invention are disclosed herein. However, specific structural and functional details disclosed herein are merely representative for purposes of describing example embodiments of the present invention. The present invention may be embodied in many alternate forms and should not be construed as limited to only the embodiments set forth herein. Further, the terminology used herein is for the purpose of describing particular embodiments only and is not intended to be limiting of example embodiments of the invention.

As used herein, the singular forms "a," "an," and "the," are intended to include the plural forms as well, unless the context clearly indicates otherwise. It further will be understood that the terms "comprises," "comprising," "includes," and/or "including," specify the presence of stated features, steps, or components, but do not preclude the presence or addition of one or more other features, steps, or components. It also should be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

In one embodiment, a base station for a cellular wireless communication system allows selectable numbers of control channels vs. voice capability to support very large SMS capability and supporting infrastructure for extended use in "black sky" situations including electromagnetic pulse events. The base station and its infrastructure are EMP-shielded, including all power sources. The base station power source is indefinitely self-sustaining via renewable energy (but still EMP-shielded) including solar panels or other means, potentially supplemented by backup generators or grid-tied. The network infrastructure comprises the base stations, servers with power at data centers, and fiber-optic cables and associated fiber-optic relays and switches.

In certain embodiments, the present invention is a telecommunication system that uses renewable energy for self-sufficiency, enables broadly distributed people to use the system, and is redundant and hard to impair or degrade. One embodiment is a "text only" LTE (Long Term Evolution) network that is EMP-hardened with shielding and filters and has base stations designed to support 100% SMS (Short Message Service) text-based messaging instead of a combination of audio, video, data, and text communications. Another embodiment is a configurable, EMP-hardened LTE network that can support a combination of audio, video, data, and text communications before an EMP event and primarily or even only text communications after an EMP event. Implementations of such systems may have one or more the following features and advantages:

By using primarily or only SMS messaging, tower capability dramatically expands. For example, a conventional cell tower can support up to roughly 50 simultaneous video calls or up to 1000 simultaneous voice calls or up to 1,700,000 SMS messages every two minutes.

Because text communications typically use less power than audio, video, and data communications, the primary or exclusive use of SMS messaging makes solar panels feasible power sources even in "sudden surges" of network traffic. In some embodiments, a base station contains a combination of visible and UV solar cells. The purpose of the inclusion of UV solar cells is that, in a man-made disaster where solar output is partially blocked, an accompanying expected effect is that UV light may be stronger than visible light due to ozone reduction. U.S. Pat. No. 9,113,550 B2, the teachings of which are incorporated herein by reference, describes a technique for shielding solar panels from electromagnetic pulses.

The system can prioritize government traffic, but still allow others to communicate. Prioritization of government traffic can be achieved (i) by adding a randomly generated prefix onto the message headers through a downloaded application onto specified cell phones so that the message identifies itself as a priority government message or (ii) by registering a phone number as a government-associated number in the system. Thus, non-government cell phone users can use the system, even post-EMP.

Since no other system providing mass two-way communications can survive EMP effects on the power grid long-term, this system can be expanded in an emergency to become the backbone of national communications.

The system is configurable to support a variable ratio of text communications to data, video, or audio communications, including up to 100% of system bandwidth and power capacity for text-only messaging. This capability enables mass communications in a power-limited scenario.

The system can automatically adjust the number and allocation of channels to ensure that the system will not drain power faster than a specified rate in order to guarantee a minimum continuity of service. For example, the system can ensure that there is enough power to keep functioning overnight by denying excess audio/video channels that drain the battery quickly.

The system can support a "digital message board" feature in which anyone can communicate by dialing a specified phone number in order to read or post unsecured text messages.

The base stations can include ground-based GPS (global positioning system) components to prevent destruction of GPS satellites from impairing system performance.

The base stations can include Geiger counters, optical particle counters, and/or air sampling devices for fallout monitoring. In some embodiments, where detection of radiation and fallout is a high priority, small, self-contained monitoring systems comprising a Geiger counter, air sampler, optical particle counter, and/or other devices, in combination with a computer, a transmitter/receiver, and a small power source, can be deployed within a specified radius of a base station to enable further continuous monitoring of radiation and fallout over multiple base stations.

The system can set its time based on chip-scale atomic clocks and voting, such that the system will not be affected by the destruction of, for example, the national clocks or GPS that regular telecom networks sync to.

If links between base stations are cut, then base stations can switch to "island mode," where one or more base stations provide SMS service between people inside coverage region of those one or more base stations. Note that the coverage radius of a single base station can be 20 or more miles. As used in this specification, an "island" refers to one or more base stations that remain in contact with each other after communications beyond the isolated group have been cut.

Conventional unmanned aerial vehicles (UAVs), such as drones, can be configured with communications gear to act as temporary base stations. Such a mobile base station can arrive quickly and stay on location until other base stations using wireless backhaul can re-route communications around a disaster site.

Replacement base stations can be airborne via airplanes, UAVs, or helicopters or vehicle-mounted, allowing for timely service restoration ideally under an hour, with averages of 2-3 hours, around a disaster site, even assuming every link to a site has been cut.

Physical features for each element in the system can include anti-tamper alarms, motion sensors, multiple cameras (regular and infrared) with overlapping fields of view, hardened physical storage, and/or fiber-optic links that cannot be cut and replaced without an alert being triggered.

Cybersecurity features of the SMS messages and system can include message encryption, one-time use codes, linking multiple messages together for a larger key-space, and other suitable techniques.

FIG. 1 illustrates an exemplary base station 100 of the overall communications system, in accordance with an embodiment of the present invention. In this embodiment, a conventional cellular tower can be selectively configured such that up to 100% of its channels are converted to control channels that support SMS messaging. In alternative embodiments, the channels can be a mix of audio, video, data, and control channels.

In this embodiment, the base station 100 has a tower mast structure 111, which is wheeled (110) to provide towed mobility. In alternative embodiments, the tower mast structure 111 can have optimizing features for airborne deployment via helicopter, such as strap and hook attachment points (not shown), a mechanism (not shown) to tilt the mast to a position parallel to the ground for easier carriage, and a mechanism (not shown) to raise the mast to a vertical position. In other alternative embodiments, the tower mast structure 111 can be attached to a vehicle (not shown) or fixed in place. In another set of alternative embodiments, the tower mast structure 111 can be eliminated if the other base station components are mounted on a UAV, such as a drone. In the embodiment of FIG. 1, the tower mast structure 111 may be made of a metal or composite polymer or polymers.

The base station 100 is powered by a solar panel system 105, which comprises one or more solar panels shielded against electromagnetic pulse using a Faraday bag design (not shown) attached to a charge controller (not shown), which in turn is attached to a battery and power management system 114 via an EMP-shielded power line 108.

The solar panels in the solar panel system 105 may be any of different varieties of solar panels including UV (ultraviolet) solar panels for potential atmospheric conditions in which reduced ozone may increase UV light while atmospheric dust may block visible light. The solar panel system 105 rests on a stand 106, which is typically metal if EMI (electromagnetic interference) shielding is required or can be polymer composite for lighter weight in other embodiments. The charge controller (not shown) may be housed in the body of the solar panel system 105 or separate from the body, e.g., within the frame of the stand 106 or elsewhere.

The EMP-shielded power line 108, which could be a regular cable with EMP shielding or a coaxial cable, connects the solar panel system 105 to an EMP-shielded compartment 113. The EMP-shielded compartment 113 is made of a solid conductive metal such as copper, stainless steel, aluminum, or other material, or metal mesh shielding combined with a polymer composite structure and waterproofing. The EMP-shielded compartment 113 contains, without limitation, a battery and power management system 114, a base station and SMS controller 112, a fiber optic switch 109, a chip-scale atomic clock 115, interconnections (not shown) for power and data between the elements, and a fiber-optic cable 107 leading out of the EMP-shielded compartment 113.

The battery and power management system 114 has sufficient capacity to distribute power to allow the system to function for at least a 24-hour period on batteries alone, with the batteries (not shown) being made of lithium-ion, lead-acid, marine deep-cycle, or other suitable battery type. The battery and power management system 114 is compatible with the recharge rate of the attached solar panel system 105. The battery and power management system 114 powers the base station and SMS controller 112.

The base station and SMS controller 112 within the shielded compartment 113 fulfills virtually all the computing needs of the base station 100 and stores a copy of information received locally. The base station and SMS controller 112 is connected to a fiber optic switch 109, which is in turn connected to the fiber-optic cable 107, which in turn connects to the larger outside network. In alternative embodiments, the base station and SMS controller 112 may be connected to the larger outside network via a wireless backhaul (not shown) instead of or in addition to the fiber-optic cable 107.

The shielded compartment 113 further contains a chip-scale atomic clock 115 for timing of messages and system control.

Mounted on various sections of the tower mast structure 111 are one or more cameras 104 connected via EMP-shielded wire (not shown) to the base station and SMS controller 112 and ultimately to the fiber-optic cable 107. Within or on the tower mast structure 111, an EMP filter 103 lies on the line between the antennas 102 and the base station and SMS controller 112 to prevent damage to the base station and SMS controller 112. Attached to the tower mast structure 111 may be a light 101 to prevent low-flying aircraft from hitting the tower.

FIG. 2 illustrates an exemplary base station 200 of the overall communications system, in accordance with another embodiment of the present invention. Elements in base station 200 that are analogous to elements in base station 100 of FIG. 1 are labeled with analogous labels. Base station 200 also has the following elements that are not part of base station 100.

In this embodiment, the EMP-shielded compartment 213 also contains a ground-based GPS component 217. The EMP-shielded compartment may also contain a backup power generator 221, a power cable 223 for tying the base station 200 to the power grid (not shown), and an EMP filter 222 either inside or outside the body of the EMP-shielded compartment 213 to protect the electrical component inside the compartment 213 from EMP events occurring in the power grid.

The chip-scale atomic clock 215 can be linked to the ground-based GPS component 217. The ground-based GPS component 217 can, with signals received from antenna sets 202 routed through the base station controller 212 and the chip-scale atomic clock 215, determine its own position and enable aircraft to utilize the base station 200 as a reference point.

Also attached to the tower mast structure 211 are one or more Geiger counters 219 to monitor fallout radiation and one or more optical particle sensors 218 to monitor weather and particle conditions, with elements 211, 218, and 219 being shielded within a flexible Faraday cage structure (not shown). Further attached to the tower mast structure 211 is an optional radio link 220 enabling direct radio communications through the tower. Also attached to the tower mast structure 211 is an antenna 224 for wireless backhaul.

FIG. 3 illustrates a basic exemplary communications system 300, in accordance with one embodiment of the present invention. FIG. 3 shows one cell phone 301 communicating with one base station 302 of the system 300, which includes multiple other base stations 302 (not shown), each of which is capable of communicating with multiple cell phones 301 (not shown). In general, each base station 302 can send and receive wireless signals to and from one or more nearby cell phones 301. The base station 302 is connected via fiber-optic cable 303 and amplifier 305 or wireless backhaul (not shown) to a server 304 either directly or via a chain of one or more other base stations, where the server 304 manages various message traffic. It should be noted that many combinations of multiple sets of base stations 302, fiber optic lines 303, amplifiers 305, and servers 304 can be arranged in layers to create local and overall network hierarchies.

FIG. 4 illustrates a more-complex exemplary communications system 400, in accordance with another embodiment of the present invention. In this embodiment, a base station 402a transmits and receives SMS messages and other data to and from one or more cell phones 401, aircraft 408 modified to communicate with the base station 402a, and/or satellites 406. The base station 402a can connect locally to one or more other base stations 402b and 402c via wireless backhaul or fiber-optic cables 403, which in turn connect directly to a fiber-optic amplifier subsystem 405. An SMS message can be communicated if both sender and receiver cell phones or vehicles are located within the local area around the base station 402a, preventing the entire chain from being involved. However, if the target cell phone is not in a local area around the base station 402a, then the base station 402a can connect to a nearby base station 402b, which can further connect to a more-distant base station 402c, and so on.

Alternatively, as shown in FIG. 4, base station 402a has a fiber-optic connection 403a via a fiber-optic amplifier 405a to a data center server 404a. Similarly, base station 402c has a fiber-optic connection 403c via a fiber-optic amplifier 405c to a data center server 404c. The data center servers 404a and 404c may in turn connect to each other via a controlling server 407 that can direct messages to the appropriate channel. From here, the process described thus far can then be reversed to ensure a message travels back down along a correct node tree and reach the intended recipient.

Software Functions

The following is a list of software functions that may be supported by a base station in various communication systems of the invention.

The base station translates signals from the Geiger counter and one or more optical particle counters into text-based communications that are transmitted to a centralized server that monitors radiation and particle levels over multiple different base station cells.

Using the chip-scale atomic clock, the base station can accurately figure out the current time. As such, when a group of base stations are in communication with one another, they can sync the system time via electronic voting.

The base station can determine whether the base station should be in "island mode" when surrounding base stations are not functioning properly. This may be accomplished by detecting a lack of signals or confusing and contradictory signals from nearby base stations.

The base station builds a directory of local phones in the area from scratch or from telecom assets and then forwards that information to a centralized server to organize so that messages can be forwarded to the appropriate chain.

The base station converts the video from the security camera or cameras and streams the video through the fiber-optic connection to a remote server.

The base station balances power requirements and availability to ensure continual operation.

The base station continually monitors its status so that, as base stations are added in and dropped out of the network, system security can be maintained to prevent insertion of false base station nodes from spamming the rest of the network and also prevent unauthorized dropouts that may indicate an attempt to hack one node to affect the rest of the system nodes, while the phone number directory is updated continually.

The base station can be implemented using modified versions of conventional base stations so that the number of control channels can be dynamically changed in accordance with traffic, power management, and system demands to accommodate and prioritize text traffic.

The base station can implement security algorithms and encryption to ensure that cell phone "cloning" will not enable outside attackers to gain access to sensitive information from the system.

The base station ensures that priority messages go through within the power management scheme.

The communication system may set limits on cell phone usage from a particular subset of base stations or from a particular base station to prevent system spamming and attack.

Messages will be forwarded and stored so that digital dropboxes are created for each phone number so that anyone who knows the number can view all unsecure messages sent to that number and post accordingly. This allows for people who have lost their phones to still view their messages and be able to communicate even without their own phones.

The fiber-optic cables may have a near-continuous pulse to prevent tampering. Any cutting of the line will cause a temporary cessation of signal that can be detected by the monitoring site, thereby ensuring the line is untappable.

Since text messaging is inherently unsecure due to the small number of possible combinations (a text message has a size limitation in general), the communication system will allow a relatively large communication to be contained piecemeal within multiple text messages, making the overall communication harder to hack and therefore more secure due to the larger set of encoding possibilities.

A secure implementation of the messaging may include a downloadable software application that decrypts encrypted communications between a base station and the recipient. As such, without the physical phone, it would be difficult to hack the communications.

The software implemented will ensure that each secure message is encrypted at the point when sent to the base station by the cell phone, throughout the system, and from the base station to the cell phone.

One or more embodiments of the invention may have one or more of the following features:

At least one base station capable of transmitting and receiving SMS text messages;

The base station may comprise a Faraday cage comprising at least one electrically conductive sheet material comprising a substantially transparent and flexible sheet material sealed with magnets or other means to form an RF-reducing seal, the transparent sheet material operable to enable usage of solar panels in the shield and/or containing one or more EMP-shielded solid housings for associated electronic devices;

The base station can balance the number of control channels vs. video or voice channels with an algorithm that adjusts the number of channels based on power consumption, weather/time of day, and amount of message traffic. In a grid-tied state where power consumption is not a key factor due to availability, the number of control channels will be limited to being enough just for supporting local devices. When power consumption becomes a concern (for example, when the grid is down), the number of control channels increases, while video and voice channels decrease, e.g., dramatically. Weather/time of day is an important element as well; at night, towers are not as operational as during the day, so fewer active channels are needed; additionally, with respect to power consumption, since no solar energy can be generated at night, the base station must limit usage so that priority texts can get through on limited battery power. This means that the station should have a means of determining what time it will receive sunlight (so it should know the time of sunrise and sunset on a daily basis) and will reduce power consumption throughout a whole day to ensure that a dynamic reserve amount of energy is always available to continue operations through the night, with the reserve decreasing as daytime approaches. Assuming the stations can receive weather forecasts, then the likelihood of incoming solar energy can be predicted to some extent and usage can be restricted to match supply if weather is bad (e.g., less expected sunlight implies more restrictions and fewer voice/data channels, with control channels possibly decreasing in number as well to save power). Regarding the amount of message traffic—as more messages come in, the number of control channels increases while voice and data are restricted to save power. Voice and data channels are maximized during times when power is unrestricted and there is less need for text messaging capability. Voice and data channels are minimized and text is maximized when utilization is high and power availability is low.

The base station may comprise a physical tower mast and supporting structure;

The base station may comprise solar panels and associated wiring to connect the solar panels to a power management and storage system along with physical attachment points to the physical tower mast;

The base station may comprise a highly accurate clock to synchronize various towers, potentially a CSAC (chip-scale atomic clock);

The power management and storage system may comprise long-lasting and high-capacity batteries to sustain high energy storage capacity for at least a 24-hour cycle and manage the solar panels, with associated wiring to connect to a message service center and local server;

The base station may be designed to adjust the number of control channels up to 100% of the allotted bandwidth to change the tower's SMS-handling capacity to up to 100%;

The base station may implement management software to build a directory of local cell phones from scratch and pass directory information, route SMS traffic both locally around the base station cell, and to other base stations or data centers through the base station's EMP-filtered antenna and through fiber-optic cables or wireless backhaul;

The base station may be able to handle unexpected system disruptions due to loss of nearby towers with minimal local and system disruption;

The fiber-optic backhaul may comprise at least one fiber optic switch and a fiber-optic cable;

The base station may comprise an EMP-filtered antenna having at least one EMP filter, power connections, and transmitters and receivers as well as associated data cables, to transmit and receive SMS radio signals;

The communication system may comprise at least one data server comprising at least one message service center and potentially including remotely located servers at data centers for system-level directory call-routing, message storage, and, in general, system management;

The base station may comprise fiber-optic relays/amplifiers with EMP-shielding and renewable solar power generation;

The fiber-optic cables may be attached to the fiber-optic relays;

The Faraday cage may be a mesh material around the solar panels designed to pass heat through the cage;

System-level voting may be implemented with the chip-scale atomic clocks to synchronize the time as a whole or in parts if communications between various system elements are severed;

The base station may implement "island mode" software to ensure that, even if communications to other base stations are not possible, the base station can be useful for allowing people in the immediate tower radius to communicate, with the "island mode" software deciding, based on a lack of incoming signals from a point of control (servers, etc.), whether it is isolated from other towers;

The base station may implement "digital message board" software so that any person who knows a specific number can view all unsecured-level messages sent to a given phone number or post new unsecured messages so that others who type in the phone number can retrieve all messages associated with that number. This allows users who have lost their phones in a natural or manmade disaster to communicate with others who know the phone number of the missing phone. The base station further would enable communication with virtually any device, even old phones normally no longer in use, without needing to access subscriber data as normally would be the case, thereby allowing full communications;

The base station may implement a priority system for certain message traffic to ensure priority messages go through based on either an additional, dynamic code added to the message header or by a stored database of phone numbers associated with the ability to have priority;

The base station may implement usage limits on non-priority traffic by ensuring that each phone number in the base station radius does not exceed a certain number of messages within a given time frame;

The base station may reduce the frequency of status checks with individual cell phones in order to reduce power consumption, with the frequency to be dynamic and determined by an algorithm balancing power output with necessary traffic capacity;

The base station may include UV solar panels in addition to regular, visible-light solar panels to maximize solar energy harvesting in case of a "nuclear winter" scenario;

Radio and SMS links may be incorporated into one or more base stations to enable digital communications with aircraft through the communication system;

The base station may pass internal system updates and status checks to allow technicians to gauge and direct system health actively before, during, and after a natural disaster or manmade event;

A ground-based GPS system may be implemented to allow nearby users to determine their own position relative to at least one base station's fixed location;

The base station may have one or more Geiger counters, modified to report results digitally to the base station, to allow radiation levels to be monitored and status messages to be sent;

The base station may have optical particle counters and/or air sampling devices to allow dust and fallout particles to be monitored and counted and status messages to be sent;

The base station may have radio links to enable digital communications with satellites, vehicles, and/or submarines through the communication system;

The base station may be mobile by way of a transportation device, such as a helicopter, airplane, ship, train, or tow vehicle, or incorporated into a truck or car-type vehicle;

The base station may encrypt SMS communications to prevent hacking using the highest available protocols;

The base station may implement security measures to ensure low probability of SMS interception and decryption;

The base station may have security cameras and anti-tamper devices to monitor the base station site and fiber-optic nodes;

The base station may implement fiber-optic alarms to prevent the base station and fiber-optic nodes from being hacked on-site or for individual base stations to be taken offline without an alert being generated;

The base station may implement cybersecurity measures to prevent hacking of the base station or fiber-optic nodes or the communication system;

UAVs may be used in place of stationary base stations for limited durations to communicate in the event of base station loss;

The base station may comprise gateways to prevent message spamming;

The base station may comprise motion sensors to trigger cameras to watch a particular site;

The communication system may allow anyone to communicate without cost instead of routing through telecom providers to check usage rights;

The base station may comprise solar panels that are grid-tied and EMP-filtered to enable the communication system to generate revenue through power sales back to the grid during times when the communication system is operating at reduced capacity;

The base station may have radiation-hardened elements to avoid degradation due to long-term radiation exposure.

Unless explicitly stated otherwise, each numerical value and range should be interpreted as being approximate as if the word "about" or "approximately" preceded the value or range.

It will be further understood that various changes in the details, materials, and arrangements of the parts which have been described and illustrated in order to explain embodiments of this invention may be made by those skilled in the art without departing from embodiments of the invention encompassed by the following claims.

In this specification including any claims, the term "each" may be used to refer to one or more specified characteristics of a plurality of previously recited elements or steps. When used with the open-ended term "comprising," the recitation of the term "each" does not exclude additional, unrecited elements or steps. Thus, it will be understood that an apparatus may have additional, unrecited elements and a method may have additional, unrecited steps, where the additional, unrecited elements or steps do not have the one or more specified characteristics.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they fall within the scope of the claims.

What is claimed is:

1. A base station for a cellular wireless communication system comprising the base station and a plurality of other base stations, wherein the base station comprises:

one or more antennas configured to transmit and receive communications signals to and from one or more wireless units within a coverage area of the base station, wherein the communications signals include text messages;

a base station controller configured to process the communications signals;

one or more solar arrays configured to convert light into power for operating the base station independent of any power grid; and one or more batteries configured to store power for operating the base station independent of any power grid, wherein the base station comprises at least some components that are hardened against electromagnetic pulse (EMP) events, wherein:

the communications signals are a dynamic combination of text, voice, and data signals; and a combination of control channels corresponding to the communications signals is dynamically generated based on at least power consumption, weather/time of day, and amount of message traffic.

2. The base station of claim 1, wherein:

prior to an EMP event, the base station is configured to be powered by at least one of a power grid and the one or more solar arrays; and after an EMP event, the base station is configured to be powered by the one or more solar arrays and the one or more batteries independent of the power grid.

3. The base station of claim 1, wherein the one or more solar arrays comprise:

solar cells configured to convert visible light into power; and solar cells configured to convert ultraviolet (UV) light into power.

4. The base station of claim 1, wherein:

prior to an EMP event, the base station is configured to support a pre-EMP distribution comprising a pre-EMP maximum amount of text messages and a pre-EMP maximum amount of non-text communications; and after an EMP event, the base station is configured to support a post-EMP distribution different from the pre-EMP distribution, in which (i) a post-EMP maximum amount of text messages is greater than the pre-EMP maximum amount of text messages and (i) a post-EMP maximum amount of non-text communications is less than the pre-EMP maximum amount of non-text communications, with the maximum amounts are dynamically determined based on a combination of power availability, time and weather, and message/voice traffic.

5. The base station of claim 4, wherein the base station is configured to support more control channels after the EMP event than before the EMP event.

6. The base station of claim 5, wherein the base station is configured to implement fewer status checks with wireless units after the EMP event than before the EMP event in order to save power.

7. The base station of claim 1, wherein at least one hardened component comprises a Faraday cage.

8. The base station of claim 7, wherein:
the at least one hardened component comprises a solar array; and
the Faraday cage for the solar array comprises at least one electrically conductive, substantially transparent sheet material sealed with magnets or other means to form an RF-reducing seal, the sheet material configured to allow the light to pass through the Faraday cage to the solar array.

9. The base station of claim 8, wherein the Faraday cage for the solar array further comprises a conductive, mesh material that enables heat to flow from the solar array through the Faraday cage.

10. The base station of claim 1, further comprising a chip-scale atomic clock configured to generate a clock signal used to operate the base station.

11. The base station of claim 1, further comprising one or more backhaul components configured to support communications with other base stations in the communication system.

12. The base station of claim 11, wherein the one or more backhaul components comprise a backhaul antenna for wireless backhaul with the other base stations.

13. The base station of claim 11, wherein the one or more backhaul components comprise a fiber-optic cable for fiber-optic backhaul with the other base stations.

14. The base station of claim 13, wherein the fiber-optic cable is connected to a server that is configured to communicate with the other base stations via other fiber-optic cables.

15. The base station of claim 11, wherein:
multiple base stations each comprise a chip-scale atomic clock configured to generate a local clock signal; and
the communication system is configured to generate a system clock signal for the multiple base stations based on the multiple local clock signals generated by the multiple chip-scale atomic clocks.

16. The base station of claim 1, further comprising one or more EMP filters configured to protect one or more components of the base station from EMP-related damage.

17. The base station of claim 16, wherein the one or more EMP filters comprise an EMP filter (i) connected between the one or more antennas and the base station controller and (ii) configured to protect the base station controller from an EMP event occurring at the one or more antennas.

18. The base station of claim 16, wherein the one or more EMP filters comprise an EMP filter connected between the base station and a power grid to protect the base station from an EMP event occurring within the power grid.

19. The base station of claim 1, wherein the base station is mobile such that the base station can be moved to a site containing a non-functioning base station in order for the mobile base station to support wireless communications for the site of the non-functioning base station.

20. The base station of claim 1, wherein the base station controller is configured to generate a directory of local wireless units.

21. The base station of claim 1, wherein the base station is configured to operate as part of an island in an island mode in which the base station supports text messaging between wireless units within the coverage area of the base station.

22. The base station of claim 21, wherein:
the island comprises the base station and one or more other base stations, but not all of the other base stations in the communication system; and
in the island mode, the base station is configured to support text messaging between (i) a wireless unit within the base station's coverage area and (ii) one or more wireless units within the coverage areas of the one or more base stations, but not all of the other base stations in the communication system.

23. The base station of claim 1, wherein the base station controller is configured to support a digital message board in which (i) a first user can post a text message to the digital message board using a first wireless unit and a first telephone number and (ii) one or more other users can retrieve the text message from the digital message board using one or more other wireless units and the first telephone number.

24. The base station of claim 1, wherein the base station controller is configured to implement priority-based communications in which text messages from higher-priority wireless units have priority over text messages from lower-priority wireless units.

25. The base station of claim 24, wherein the base station controller is configured to implement usage limits on the lower-priority wireless units.

26. The base station of claim 1, wherein the base station is configured to support communications with aircraft.

27. The base station of claim 1, further comprising one or more components configured to support a ground-based GPS system to enable wireless units within the coverage area of the base station to determine their positions relative to a fixed reference point in the base station coordinate system.

28. The base station of claim 1, further comprising one or more meters configured to monitor at least one of radiation level and air quality at the base station site.

29. The base station of claim 1, wherein the base station controller is configured to generate two or more different text messages for a single wireless communication to inhibit improper eavesdropping on the single wireless communication.

30. The invention of claim 1, wherein:
prior to an EMP event, the base station is configured to be powered by at least one of a power grid and the one or more solar arrays;
after an EMP event, the base station is configured to be powered by the one or more solar arrays and the one or more batteries independent of the power grid;
the one or more solar arrays comprise:
solar cells configured to convert visible light into power; and
solar cells configured to convert ultraviolet (UV) light into power;
prior to an EMP event, the base station is configured to support a pre-EMP distribution comprising a pre-EMP maximum amount of text messages and a pre-EMP maximum amount of non-text communications;
after an EMP event, the base station is configured to support a post-EMP distribution different from the pre-EMP distribution, in which (i) a post-EMP maximum amount of text messages is greater than the pre-EMP maximum amount of text messages and (i) a post-EMP maximum amount of non-text communications is less than the pre-EMP maximum amount of non-text communications, with the maximum amounts are dynamically determined based on a combination of power availability, time and weather, and message/voice traffic;

the base station is configured to support more control channels after the EMP event than before the EMP event;

the base station is configured to implement fewer status checks with wireless units after the EMP event than before the EMP event in order to save power;

at least one hardened component comprises a Faraday cage;

the at least one hardened component comprises a solar array;

the Faraday cage for the solar array comprises at least one electrically conductive, substantially transparent sheet material sealed with magnets or other means to form an RF-reducing seal, the sheet material configured to allow the light to pass through the Faraday cage to the solar array;

the Faraday cage for the solar array further comprises a conductive, mesh material that enables heat to flow from the solar array through the Faraday cage;

further comprising a chip-scale atomic clock configured to generate a clock signal used to operate the base station;

further comprising one or more backhaul components configured to support communications with other base stations in the communication system;

the one or more backhaul components comprise a backhaul antenna for wireless backhaul with the other base stations or a fiber-optic cable for fiber-optic backhaul with the other base stations, wherein the fiber-optic cable is connected to a server that is configured to communicate with the other base stations via other fiber-optic cables;

multiple base stations each comprise a chip-scale atomic clock configured to generate a local clock signal;

the communication system is configured to generate a system clock signal for the multiple base stations based on the multiple local clock signals generated by the multiple chip-scale atomic clocks;

further comprising one or more EMP filters configured to protect one or more components of the base station from EMP-related damage;

the one or more EMP filters comprise an EMP filter (i) connected between the one or more antennas and the base station controller and (ii) configured to protect the base station controller from an EMP event occurring at the one or more antennas;

the one or more EMP filters comprise an EMP filter connected between the base station and a power grid to protect the base station from an EMP event occurring within the power grid;

the base station is mobile such that the base station can be moved to a site containing a non-functioning base station in order for the mobile base station to support wireless communications for the site of the non-functioning base station;

the base station controller is configured to generate a directory of local wireless units;

the base station is configured to operate as part of an island in an island mode in which the base station supports text messaging between wireless units within the coverage area of the base station;

the island comprises the base station and one or more other base stations, but not all of the other base stations in the communication system;

in the island mode, the base station is configured to support text messaging between (i) a wireless unit within the base station's coverage area and (ii) one or more wireless units within the coverage areas of the one or more base stations, but not all of the other base stations in the communication system;

the base station controller is configured to support a digital message board in which (i) a first user can post a text message to the digital message board using a first wireless unit and a first telephone number and (ii) one or more other users can retrieve the text message from the digital message board using one or more other wireless units and the first telephone number;

the base station controller is configured to implement priority-based communications in which text messages from higher-priority wireless units have priority over text messages from lower-priority wireless units;

the base station controller is configured to implement usage limits on the lower-priority wireless units;

the base station is configured to support communications with aircraft;

further comprising one or more components configured to support a ground-based GPS system to enable wireless units within the coverage area of the base station to determine their positions relative to a fixed reference point in the base station coordinate system;

further comprising one or more meters configured to monitor at least one of radiation level and air quality at the base station site; and the base station controller is configured to generate two or more different text messages for a single wireless communication to inhibit improper eavesdropping on the single wireless communication.

31. A base station for a cellular wireless communication system comprising the base station and a plurality of other base stations, wherein the base station comprises:

one or more antennas configured to transmit and receive communications signals to and from one or more wireless units within a coverage area of the base station, wherein the communications signals include text messages;

a base station controller configured to process the communications signals;

one or more solar arrays configured to convert light into power for operating the base station independent of any power grid; and one or more batteries configured to store power for operating the base station independent of any power grid, wherein the base station comprises at least some components that are hardened against electromagnetic pulse (EMP) events, wherein:

prior to an EMP event, the base station is configured to support a pre-EMP distribution comprising a pre-EMP maximum amount of text messages and a pre-EMP maximum amount of non-text communications; and after an EMP event, the base station is configured to support a post-EMP distribution different from the pre-EMP distribution, in which (i) a post-EMP maximum amount of text messages is greater than the pre-EMP maximum amount of text messages and (i) a post-EMP maximum amount of non-text communications is less than the pre-EMP maximum amount of non-text communications, with the maximum amounts are dynamically determined based on a combination of power availability, time and weather, and message/voice traffic.

32. The base station of claim 31, wherein the base station is configured to support more control channels after the EMP event than before the EMP event.

33. The base station of claim 32, wherein the base station is configured to implement fewer status checks with wireless units after the EMP event than before the EMP event in order to save power.

34. A base station for a cellular wireless communication system comprising the base station and a plurality of other base stations, wherein the base station comprises:
   one or more antennas configured to transmit and receive communications signals to and from one or more wireless units within a coverage area of the base station, wherein the communications signals include text messages;
   a base station controller configured to process the communications signals;
   one or more solar arrays configured to convert light into power for operating the base station independent of any power grid; and
   one or more batteries configured to store power for operating the base station independent of any power grid, wherein the base station comprises at least some components that are hardened against electromagnetic pulse (EMP) events, wherein:
      at least one hardened component comprises a Faraday cage;
      the at least one hardened component comprises a solar array; and
      the Faraday cage for the solar array comprises at least one electrically conductive, substantially transparent sheet material sealed with magnets or other means to form an RF-reducing seal, the sheet material configured to allow the light to pass through the Faraday cage to the solar array.

35. The base station of claim 34, wherein the Faraday cage for the solar array further comprises a conductive, mesh material that enables heat to flow from the solar array through the Faraday cage.

36. A base station for a cellular wireless communication system comprising the base station and a plurality of other base stations, wherein the base station comprises:
   one or more antennas configured to transmit and receive communications signals to and from one or more wireless units within a coverage area of the base station, wherein the communications signals include text messages;
   a base station controller configured to process the communications signals;
   one or more solar arrays configured to convert light into power for operating the base station independent of any power grid;
   one or more batteries configured to store power for operating the base station independent of any power grid, wherein the base station comprises at least some components that are hardened against electromagnetic pulse (EMP) events; and
   one or more backhaul components configured to support communications with other base stations in the communication system, wherein:
      multiple base stations each comprise a chip-scale atomic clock configured to generate a local clock signal; and
      the communication system is configured to generate a system clock signal for the multiple base stations based on the multiple local clock signals generated by the multiple chip-scale atomic clocks.

37. A base station for a cellular wireless communication system comprising the base station and a plurality of other base stations, wherein the base station comprises:
   one or more antennas configured to transmit and receive communications signals to and from one or more wireless units within a coverage area of the base station, wherein the communications signals include text messages;
   a base station controller configured to process the communications signals;
   one or more solar arrays configured to convert light into power for operating the base station independent of any power grid;
   one or more batteries configured to store power for operating the base station independent of any power grid, wherein the base station comprises at least some components that are hardened against electromagnetic pulse (EMP) events; and
   one or more EMP filters configured to protect one or more components of the base station from EMP-related damage, wherein the one or more EMP filters comprise an EMP filter (i) connected between the one or more antennas and the base station controller and (ii) configured to protect the base station controller from an EMP event occurring at the one or more antennas.

38. A base station for a cellular wireless communication system comprising the base station and a plurality of other base stations, wherein the base station comprises:
   one or more antennas configured to transmit and receive communications signals to and from one or more wireless units within a coverage area of the base station, wherein the communications signals include text messages;
   a base station controller configured to process the communications signals;
   one or more solar arrays configured to convert light into power for operating the base station independent of any power grid; and
   one or more batteries configured to store power for operating the base station independent of any power grid, wherein the base station comprises at least some components that are hardened against electromagnetic pulse (EMP) events, wherein the base station controller is configured to support a digital message board in which (i) a first user can post a text message to the digital message board using a first wireless unit and a first telephone number and (ii) one or more other users can retrieve the text message from the digital message board using one or more other wireless units and the first telephone number.

39. A base station for a cellular wireless communication system comprising the base station and a plurality of other base stations, wherein the base station comprises:
   one or more antennas configured to transmit and receive communications signals to and from one or more wireless units within a coverage area of the base station, wherein the communications signals include text messages;
   a base station controller configured to process the communications signals;
   one or more solar arrays configured to convert light into power for operating the base station independent of any power grid; and
   one or more batteries configured to store power for operating the base station independent of any power grid, wherein the base station comprises at least some components that are hardened against electromagnetic pulse (EMP) events, wherein the base station controller is configured to generate two or more different text messages for a single wireless communication to inhibit improper eavesdropping on the single wireless communication.

* * * * *